United States Patent [19]

Manz

[11] Patent Number: 4,939,905

[45] Date of Patent: Jul. 10, 1990

[54] RECOVERY SYSTEM FOR DIFFERING REFRIGERANTS

[75] Inventor: Kenneth W. Manz, Paulding, Ohio

[73] Assignee: Kent-Moore Corporation, Warren, Mich.

[21] Appl. No.: 445,763

[22] Filed: Dec. 4, 1989

[51] Int. Cl.$^5$ ............................................. F25B 45/00
[52] U.S. Cl. ......................................... 62/77; 12/149; 12/292
[58] Field of Search ............................ 62/77, 149, 292

[56] References Cited

U.S. PATENT DOCUMENTS

| | | | |
|---|---|---|---|
| 3,232,070 | 2/1966 | Sparano | 62/149 |
| 3,926,008 | 12/1975 | Webber | 62/506 X |
| 4,261,178 | 4/1981 | Cain | 62/149 |
| 4,856,289 | 9/1989 | Lofland | 62/149 |
| 4,878,356 | 11/1989 | Punches et al. | 62/149 |

Primary Examiner—William E. Tapolcai
Attorney, Agent, or Firm—Barnes, Kisselle, Raisch, Choate, Whittemore & Hulbert

[57] ABSTRACT

A refrigerant recovery system that includes a compressor having a inlet connected to a refrigeration system from which refrigerant is to be recovered, and an outlet connected through a condenser to a refrigerant storage container. The condenser includes multiple condenser sections, preferably in an integral assembly having parallel independant refrigerant flow paths. Valves alternately and selectively connect the compressor outlet through the several condenser sections to corresponding storage containers, such that differing refrigerants are fed to associated containers through correponding condenser sections without substantial intermixing or contamination.

19 Claims, 2 Drawing Sheets

RECOVERY SYSTEM FOR DIFFERING REFRIGERANTS

The present invention is directed to refrigeration handling system, and more particularly to recovery of refrigerant from refrigeration systems, such as air conditioning and heat pump systems, for purification and/or storage.

BACKGROUND AND OBJECTS OF THE INVENTION

U.S. Pat. No. 4,768,347, assigned to the assignee hereof discloses refrigerant recovery system that includes a compressor having an inlet coupled through an evaporator and through a solenoid valve to the refrigeration equipment from which refrigerant is to be withdrawn, and an outlet coupled through a condenser to a refrigerant storage container or tank. The evaporator and condenser are contained within a closed cylindrical canister for heat exchange and oil separation, the canister having an oil drain in the bottom. The refrigerant storage container is carried by a scale having a limit switch coupled to control electronics to prevent or terminate further refrigerant recovery when the container is full. The scale comprises a platform pivotally mounted by a hinge pin to a wheeled cart, which also carries the evaporator/condenser unit, compressor, control electronics, and associated valves and hoses.

U.S. Pat. No. 4,805,416, also assigned to the assignee hereof, discloses systems for recovering, purifying and recharging refrigerant in which, during a purification cycle, refrigerant is circulated from the refrigerant storage container in a closed path through a circulation valve and a filter for removing water and other contaminants, and then returned to the container. U.S. application Ser. No. 263,887, filed Oct. 28, 1988, now U.S. Pat. No. 4,878,356 and also assigned to the assignee hereof, discloses a refrigerant recovery system that includes a refrigerant storage container, refrigeration circuitry for withdrawing refrigerant from equipment under service and feeding such refrigerant to the container for storage, and a scale supporting the container for sensing impending overfill of the container. The scale includes a beam horizontally rigidly cantilevered from a base. A switch is positioned adjacent to the cantilever-remote end of the beam, and is responsive to resilient deflection of the beam to indicate impending overfill of the container, and to prevent or terminate operation of the refrigerant recovery system.

A problem with refrigerant recovery and purification systems disclosed in the noted patents and application lies in use thereof in conjunction with differing types of refrigerants, such as R-12, R-22 and R-502. When it is desired to change refrigerant types in connection with which the system is used, the entire system must be purged to insure that the refrigerants do not become intermixed and contaminated. The recovery compressor can be used to remove essentially all refrigerant from the unit inlet down to the compressor inlet fitting, including the evaporator and the system oil separator. However, to remove refrigerant from the compressor outlet through the compressor oil separator, the condenser and associated output piping requires external input of heat or pumping to clear the system, which cannot be accomplished by the unit it self. For example, the condenser can be externally heated to drive the refrigerant into the storage container, or the container can be cooled to reduce internal pressure and pull refrigerant into the container. As another alternative, an external pump can be employed.

It is a general object of the present to provide a refrigerant handling system and method that include facility for use in connection with multiple differing types of refrigerants without requiring external application of heat or pumping to clear the refrigerant lines. Another and more specific object of the present invention is to provide a refrigerant handling system and method of subject character that facilitate starting of the compressor by equalizing pressure between the compressor inlet and outlet, and/or that include an oil separator at the compressor outlet with facility for returning separated oil to the compressor inlet.

SUMMARY OF THE INVENTION

A refrigerant handling system in accordance with the present invention includes a compressor having a inlet connected to a refrigerant source, such as a refrigeration system from which refrigerant is to be recovered, and an outlet connected through a condenser to a refrigerant storage container. The condenser includes multiple condenser sections, preferably in an integral assembly having independent refrigerant flow paths. Valves alternately and selectively connect the compressor outlet through the several condenser sections to corresponding storage containers, such that differing refrigerants are fed to associated containers through corresponding condenser sections without substantial intermixing or contamination.

The condenser valves may comprise manual valves for opening and closing by an operator as a function of refrigerant type under service, or solenoid valves responsive to electronic control signals generated as a function of type of refrigerant under service. In one embodiment of the invention, valve control electronics includes temperature and pressure sensors coupled to the refrigerant lines adjacent to the compressor inlet, and a controller for determining refrigerant type and correspondingly operating the condenser feed valves as a function of the saturation pressure/temperature characteristics of refrigerant at the compressor inlet.

In the preferred embodiments of the invention, a compressor oil separator is connected to the compressor outlet for separating oil from refrigerant, and for feeding the compressor oil back to the compressor inlet for lubrication. A solenoid valve is connected across the compressor between the outlet and the inlet for equalizing pressure across the compressor, and thereby facilitating starting of the compressor.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
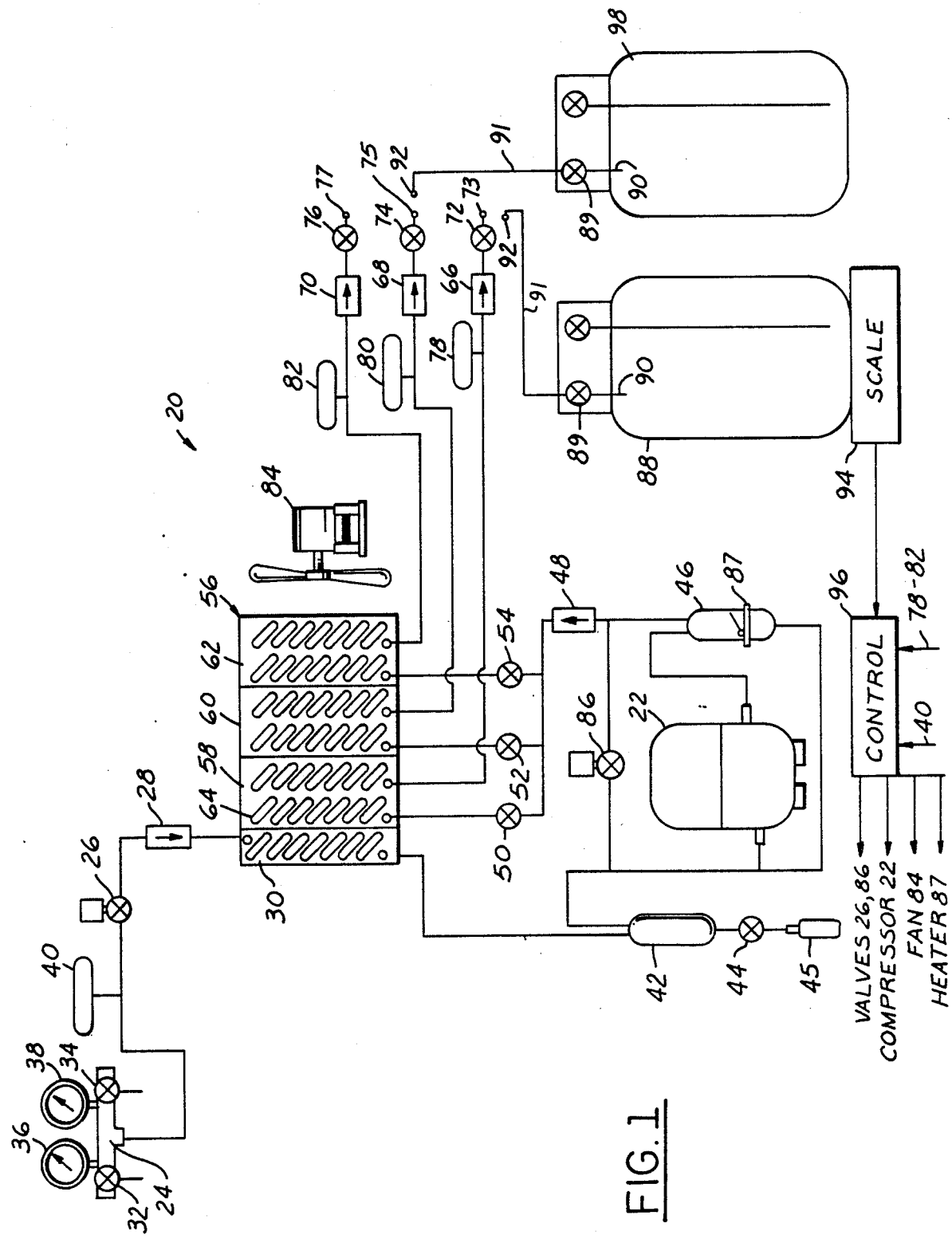
FIG. 1 is a schematic diagram of a system for recovering multiple types of refrigerants in accordance with one presently preferred embodiment of the invention.

FIG. 1 illustrates one presently preferred embodiment of a refrigerant recovery system 20 in accordance with the invention as comprising a compressor 22 having an inlet that is coupled to an input manifold 24 through a solenoid valve 26, a check valve 28 and an evaporator 30 for adding heat to refrigerant passing therethrough, and thereby insuring that refrigerant at the inlet of compressor 22 is in substantially vapor phase. Manifold 24 includes facility for connection to the high pressure and low pressure sides of a refrigeration system from which refrigerant is to be recovered. Manifold 24 also includes the usual manual valves 32, 34 and pressure gages 36, 38. A pressure switch 40 is connected between solenoid valve 26 and manifold 24, and is responsive to a predetermined low pressure to the compressor inlet from the refrigeration system to indicate removal or recovery of refrigerant therefrom. An oil separator 42 is connected between evaporator 30 and the inlet of compressor 22 for removing oil from input refrigerant vapor, and a valve 44 is coupled to separator 42 for draining oil removed from refrigerant into a catch bottle 45.

The outlet of compressor 22 is connected through a compressor oil separator 46 and a check valve 48 to a bank of three parallel manual valves 50, 52, 54. A condenser assembly 56 comprises three parallel condenser sections 58, 60, 62 each of which includes associated tubing 64 for providing parallel independent refrigerant flow paths through the respective condenser sections. The outlet of each condenser section 58, 60, 62 is connected through an associated check valve 66, 68, 70 to an associated manual valve 72, 74, 76. A high pressure switch 78, 80, 82 is connected between each condenser section 58-62 and its associated check valve 66-70. A fan 84 is positioned to direct cooling air over condenser assembly 56, including all three parallel condenser sections 58-62. Preferably, although not necessarily, condenser assembly 56 and evaporator 30 are combined in an integral unit so that heat withdrawn from refrigerant passing through the condenser sections helps evaporator refrigerant passing through evaporator 30.

A solenoid valve 86 is connected on one side between oil separator 46 and check valve 48, and at the other side to the inlet of compressor 22. An electric heater 87 is coupled to oil separator 46 to heat the walls thereof and prevent condensation of refrigerant within the oil separator. A refrigerant storage container 88 has a vapor port 90 selectively connectable by a manual valve 89, a hose 91 and a quick-disconnect coupling 92 to fittings 73, 75, 77 at the outlet sides of valves 72, 74, 76. U.S. application Ser. No. 07/334,178, filed Apr. 6, 1989 and assigned to the assignee hereof discloses a suitable coupling 92 and associated fitting. Container 88 is carried by a scale 94 that provides an electronic signal to a control electronics package 96 indicating weight of refrigerant in container 88 and/or impending overfill of the container. Control electronics 96 also receives input signals from pressure sensors 40 and 78-82, and provides output signals to operate fan 84, compressor 22, solenoid valves 26, 86 and heater 87.

In operation, manifold 24 is connected to a refrigeration system from which refrigerant is to be recovered. Container coupling 92 is connected to the outlet fitting of the valve 72, 74, 76 associated with the particular type of refrigerant within the refrigeration system. That valve 72, 74 or 76 is then opened, and the other two are left closed. The condenser feed valve 50, 52, 54 associated with that particular type of refrigerant is likewise opened, and the other two are left closed. If the refrigerant to be recovered is R-12 for example, and condenser section 58 is preselected for use in conjunction with R-12 refrigerant, coupling 92 is fastened to fitting 73, and valves 50, 72 are opened. Valves 50-54 and 72-76 preferably are labeled at the factory to prevent possible confusion of condenser sections in the field. For example, valves 50, 72 may be labeled "R-12", valves 52, 74 may be labeled "R-22" and valves 54, 76 may be labeled "R-502". Valves pairs 50, 72, 52, 74 and 54, 76 may comprise respective double valves opened and closed by a single suitably labeled handle, with fittings 73, 75, 77 accessible and labeled on the sidewall of the unit.

With container 88 so connective and the applicable manual valves open, control electronics 96 is then activated by the operator to energize fan 84, heater 87 and compressor 22. Valve 86 is normally open so as to connect the compressor outlet to the compressor inlet. After compressor 22 beings operation, solenoid valve 86 is closed by the control electronics. Thus, valve 86 serves the limited function of equalizing pressure across the compressor to facilitate starting. Valve 26 is then opened by the control electronics, and the compressor draws refrigerant from the system under service through evaporator 30 and oil separator 42. Compressed refrigerant is fed through oil separator 46 and one of the three condenser sections 58, 60, 62 to container 88. In the event of impending overfill of container 88, sensed either by sensors 78-82 or scale 94, control electronics 96 is shut down. Otherwise, when pressure sensor 40 senses removal of substantially all refrigerant from the system under service, valve 26 is closed, compressor 22, heater 87 and fan 84 are deenergized, and valve 86 is opened. While compressor 22 is operating, oil in refrigerant at the compressor outlet is separated by separator 46, which typically has a float mechanism to open a needle valve and allow accumulated oil to return to the compressor inlet. Check valve 48 and solenoid valve 86 allow automatic pressurization of oil separator 42 and to assist removal of oil through valve 44.

If system 20 is next to be used in conjunction with a differing type of refrigerant, for example R-22 instead of R-12, compressor 22 is first operated to pull any remaining R-12 refrigerant on the inlet side through the evaporator and compressor inlet, and to urge refrigerant from the outlet side under pressure into tank 88. Valves 50, 72 are then closed, with valve 52, 54 and 74, 76 remaining closed. Valve 89 of container 88 is then closed, and coupling 92 is removed from connection to valve 72. Container 88 is removed from scale 94 and replaced with a new container 98 for R-22 refrigerant. Container 98 has a vapor port 90 with associated manual valve 89, hose 91 and coupling 92, and may be connected by its quick-disconnect coupling 92 to the R-22 section of condenser 56, —e.g., connection to fitting 75 of valve 74 and condenser section 60. With coupling 92 of tank 98 connected to valve 74, valves 52, 74 are opened, while valves 50, 54, 72, 76 remain closed. Manifold 24 is then connected in the usual manner to the refrigeration system from which R-22 refrigerant is to be removed, and control electronics 96 is activated by the operator.

Figure 2:
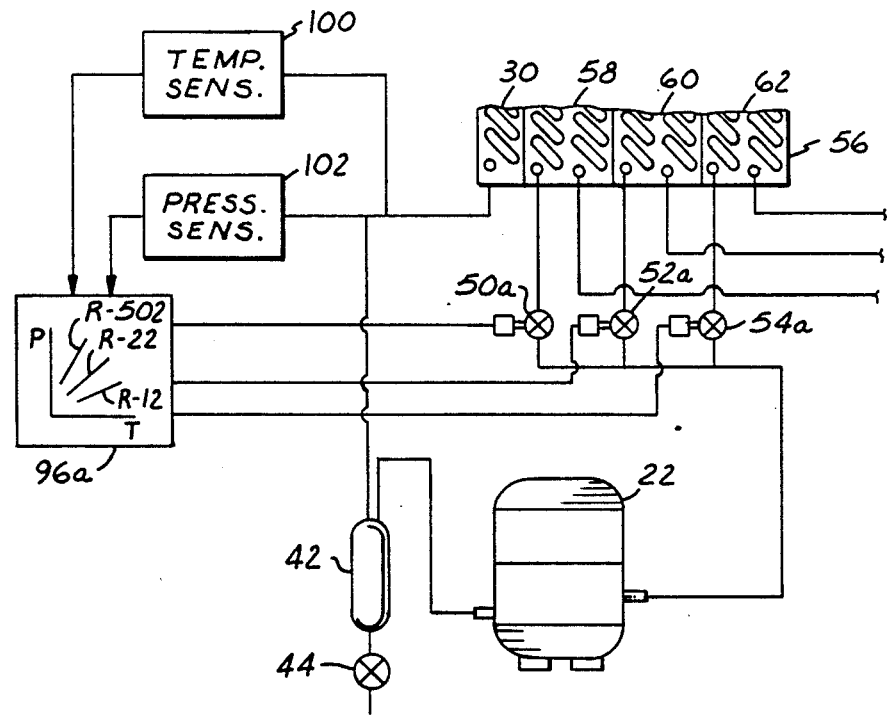
FIGS. 2 and 3 are fragmentary schematic diagrams that illustrate respective modifications to the preferred embodiment of FIG. 1.

FIG. 2 illustrates a modification to FIG. 1 in which manual valves 50, 52, 54 are replaced by electronic solenoid valves 50a, 52a, 54a. A temperature sensor 100 is coupled the the input refrigerant line at the inlet side of compressor 22 between evaporator 30 and oil separator 42. Likewise, a pressure sensor 102 is coupled to the refrigerant line between evaporator 30 and oil separator 42. Each of the sensors 100, 102 feeds an associated electronic signal to control electronics 96a indicative of refrigerant temperature or pressure. Control electronics 96a, which preferably is microprocessor-based, includes internal facility, such as a look-up table or the like schematically illustrates in FIG. 2, for determining refrigerant type from the pressure and temperature saturation characteristics of the refrigerant being drawn into compressor 22, and for automatically operating solenoid valves 50a, 52a, 54a accordingly. Manual valves 72, 74, 76 (FIG. 1) may likewise be replaced by solenoid valves coupled to control electronics 96a.

Figure 3:
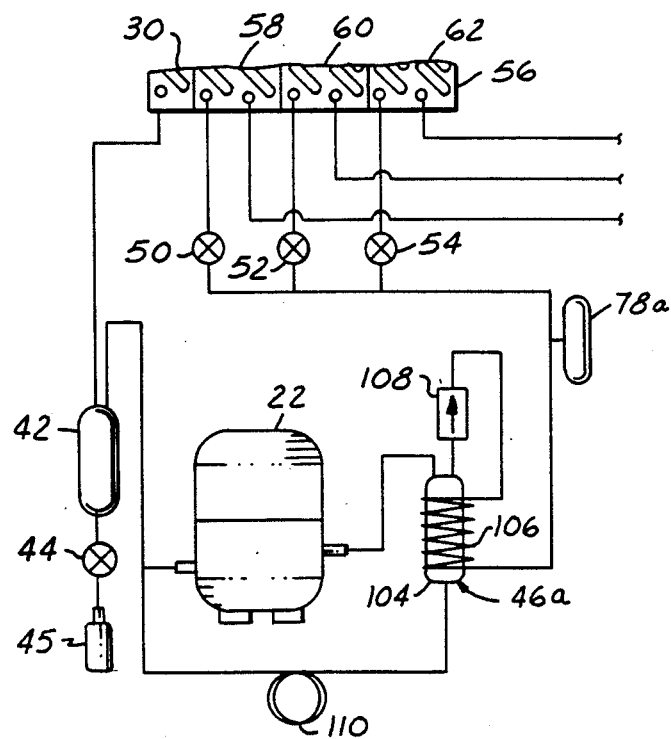

FIG. 3 illustrates another modification to the preferred embodiment of FIG. 1 in which the compressor oil separator 46a includes a closed canister 104 surrounded by a heat exchange coil 106. The outlet of compressor 22 is coupled to the upper portion of canister 104, and such upper portion is connected through a check valve 108 to coil 106, and thence to valves 50–54. A high pressure switch 78a, replacing all three pressure sensor switches 78–82 in FIG. 1, is connected between coil 106 and valves 50–54. A capillary tube 110 is connected between the lower portion of canister 104 and the inlet of compressor 22. The vapor output of compressor 22 is fed to canister 104, and thence to coil 106 surrounding canister 104 so as to heat the canister and help prevent condensation of refrigerant within the canister. Oil separated from refrigerant at the compressor outlet collects at the lower portion of canister 104, and is drawn to the compressor inlet through capillary tube 110. Capillary tube 110 thus serves the dual functions of returning oil to the compressor inlet and equalizing pressure across the compressor when the compressor is shut down, thus replacing solenoid valve 86 in FIG. 1.

There is thus provided a refrigerant recovery system that fully satisfies all of the objects and aims previously set forth. That is, three different types of refrigerant can be recovered by selectively connecting the compressor outlet to the appropriate storage container through a corresponding section of the condenser assembly. There is no requirement for application of heat or external pump energy to the compressor outlet plumbing to purge refrigerant therefrom. Although the invention has been disclosed in conjunction with a refrigerant recovery system, it will be recognized that the invention may be employed in conjunction with purification of differing refrigerant types.

I claim:

1. In a refrigerant handling system that includes compressor means having an inlet and an outlet, means for connecting said compressor inlet to a refrigeration source, condenser means for withdrawing heat from and at least partially condensing refrigerant passing therethrough, and means for connecting said condenser means between said compressor outlet and a container for storing refrigerant, the improvement for handling differing types of refrigerants wherein:
   said condenser means comprises at least first and second condensers having independent refrigerant flow paths, and
   said condenser connecting means comprise means for selectively connecting said compressor outlet alternately through said first and second condensers to the storage container such that differing refrigerants are fed to associated containers through corresponding condensers without substantial intermixing or contamination.

2. The system set forth in claim 1 wherein said condenser means comprises an integral assembly having multiple independent refrigerant flow sections, and wherein said connecting means comprises means for alternately and selectively connecting said sections to said compressor outlet and to the storage container.

3. The system set forth in claim 2 further comprising a fan for directing cooling air over said assembly.

4. The system set forth in claim 3 wherein said assembly further comprises evaporator means connected to said compressor inlet for adding heat to and evaporating refrigerant passing therethrough to said inlet.

5. The system set forth in claim 4 wherein said evaporator means forms part of said integral assembly, said evaporator means and said fan being orientated such that cooling air is directed by said fan in sequence over said condensers and then over said evaporators means.

6. The system set forth in claim 1 wherein said connecting means comprises refrigerant conduit means connected to said compressor outlet and valve means for alternately connecting said conduit to said condenser sections.

7. The system set forth in claim 6 wherein said valve means comprise manual valves.

8. The system set forth in claim 6 wherein said valve means comprise solenoid valves responsive to electronic control signals, and wherein said connecting means further comprises means for selectively applying said control signals to said valves as a function of type of refrigerant in said system.

9. The system set forth in claim 8 wherein said selectively-applying means comprises means for detecting type of refrigerant in said system, and means for automatically operating said valves as a function of type of refrigerant detected.

10. The system set forth in claim 9 wherein said detecting means comprises a temperature sensor responsive to temperature of refrigerant to said inlet and a pressure sensor responsive to pressure of refrigerant to said inlet, and wherein said automatically-operating means comprises means coupled to both said sensors for opening and closing said valves as a function of a predetermined relationship between temperature and pressure of refrigerant to said compressor inlet.

11. The system set forth in claim 1 wherein said selectivly-connecting means comprises first and second solenoid valves responsive to electronic control signals for connecting said compressor outlet through said first and second condensers, and means for selectively applying said control signals to said valves as a function of type of refrigerant in said system.

12. The system set forth in claim 11 wherein said selectively-applying means comprises means for detecting type of refrigerant in said system, and means for automatically operating said valves as a function of type of refrigerant detected.

13. The system set forth in claim 12 wherein said detecting means comprises a temperature sensor responsive to temperature of refrigerant to said inlet and a pressure sensor responsive to pressure of refrigerant to said inlet, and wherein said automatically-operating means comprises means coupled to both said sensors for opening and closing said valves as a function of a predetermined relationship between temperature and pressure of refrigerant to said compressor inlet.

14. The system set forth in claim 1 further comprising means connected between said compressor inlet and said compressor outlet to ease starting of said compressor by equalizing pressure between said inlet and said outlet.

15. The system set forth in claim 14 wherein said equalizing means comprises a solenoid valve and means for closing said valve when said compressor has started operation.

16. The system set forth in claim 1 further comprising a compressor oil separator connected to said compressor outlet for removing oil form refrigerant at said outlet, and means for returning oil from said separator to said inlet.

17. The system set forth in claim 16 wherein said oil-returning means comprises capillary means connecting said oil separator to said inlet.

18. The system set forth in claim 1 for recovering refrigerant from a refrigeration system as said source, wherein said connecting means comprises means for connecting said compressor inlet to a refrigeration system under service.

19. In refrigeration apparatus that includes a compressor for pumping refrigerant and condensing means coupled to the compressor for extracting heat from and condensing refrigerant passing therethrough, a method of handling different refrigerant types in said apparatus comprising the steps of:
(a) providing said condensing means in the form of a multiple-section condenser having separate parallel refrigerant flow paths, and
(b) selectively directing refrigerant from said compressor through said condenser sections as a function of type of refrigerant passing through said compressor.

* * * * *